US009810321B2

(12) United States Patent
Nakamura

(10) Patent No.: US 9,810,321 B2
(45) Date of Patent: Nov. 7, 2017

(54) CONTROL APPARATUS FOR POWER TRANSMISSION SYSTEM

(71) Applicant: TOYOTA JIDOSHA KABUSHIKI KAISHA, Toyota-shi, Aichi-ken (JP)

(72) Inventor: Kazuaki Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/219,936

(22) Filed: Jul. 26, 2016

(65) Prior Publication Data
US 2017/0037966 A1 Feb. 9, 2017

(30) Foreign Application Priority Data

Aug. 7, 2015 (JP) .................................. 2015-157742

(51) Int. Cl.
| | |
|---|---|
| *B60W 30/20* | (2006.01) |
| *F16H 61/70* | (2006.01) |
| *F16H 37/02* | (2006.01) |
| *F16H 61/662* | (2006.01) |
| *F16H 61/02* | (2006.01) |

(52) U.S. Cl.
CPC .......... *F16H 61/702* (2013.01); *B60W 30/20* (2013.01); *F16H 37/021* (2013.01); *F16H 37/022* (2013.01); *F16H 61/0204* (2013.01); *F16H 61/662* (2013.01); *F16H 61/66259* (2013.01); *B60Y 2300/20* (2013.01); *F16H 2702/02* (2013.01); *F16H 2702/06* (2013.01)

(58) Field of Classification Search
None
See application file for complete search history.

(56) References Cited

U.S. PATENT DOCUMENTS

| | | | | |
|---|---|---|---|---|
| 7,282,011 | B2 * | 10/2007 | Tabata ..................... | B60K 6/38 477/109 |
| 8,834,319 | B2 * | 9/2014 | Nefcy .................. | B60W 10/02 180/65.23 |
| 9,115,682 | B2 * | 8/2015 | Gibson .................... | F02N 11/00 |
| 9,156,469 | B2 * | 10/2015 | Gibson ................ | B60W 20/40 |

(Continued)

FOREIGN PATENT DOCUMENTS

JP          2008-014457 A        1/2008

*Primary Examiner* — Dirk Wright
(74) *Attorney, Agent, or Firm* — Oliff PLC

(57) ABSTRACT

When a state of a vehicle is a predetermined state of the vehicle where vehicle vibration occurs, weak circulating torque is generated to fill backlash inside an automatic transmission and in a power transmission path by half-engaging a second clutch for establishing a second power transmission path while a first power transmission path remains established in the automatic transmission. A speed ratio of the second power transmission path is alternatively set to a lower vehicle speed-side speed ratio with respect to a speed ratio of the first power transmission path or a higher vehicle speed-side speed ratio with respect to the speed ratio of the first power transmission path in response to a traveling state. It is possible to generate weak circulating torque in a direction to increase an input shaft rotation speed or in a direction to reduce the input shaft rotation speed in accordance with the traveling state.

7 Claims, 5 Drawing Sheets

(56) References Cited

U.S. PATENT DOCUMENTS

| | | | | |
|---|---|---|---|---|
| 2014/0163793 A1* | 6/2014 | Kim | ................... | B60W 20/10 |
| | | | | 701/22 |
| 2015/0367749 A1* | 12/2015 | Yaguchi | ............... | B60L 15/06 |
| | | | | 701/22 |
| 2016/0068153 A1* | 3/2016 | Nefcy | ................. | B60K 6/387 |
| | | | | 701/22 |

* cited by examiner

| | C1 | C2 | B1 | B2 | B3 | F1 |
|---|---|---|---|---|---|---|
| 1st | O | | | ◎ | | △ |
| 2nd | O | O | | | | |
| 3rd | O | | | | O | |
| 4th | O | O | | | | |
| 5th | | O | | | O | |
| 6th | | O | O | | | |
| R | | | | O | O | |
| N | | | | | | |

◎ OPERATED DURING ENGINE BRAKE
△ OPERATED ONLY DURING DRIVING

CONTROL APPARATUS FOR POWER TRANSMISSION SYSTEM

INCORPORATION BY REFERENCE

The disclosure of Japanese Patent Application No. 2015-157742 filed on Aug. 7, 2015 including the specification, drawings and abstract is incorporated herein by reference in its entirety.

BACKGROUND

1. Technical Field

The present disclosure relates to a control apparatus for a power transmission system including an automatic transmission that is able to provide different power transmission paths that transmit power of a driving force source to a drive wheel.

2. Description of Related Art

There is well known a control apparatus for a power transmission system including an automatic transmission in which one of a first power transmission path and a second power transmission path, which transmits power of a driving force source to a drive wheel, is selectively established. In a predetermined state of a vehicle where vehicle vibration occurs, the control apparatus reduces the vehicle vibration or noise resulting from the vehicle vibration by half-engaging an engagement device for establishing the second power transmission path while the first transmission path remains established. This is, for example, a vibration reduction system for a vehicle, described in Japanese Patent Application Publication No. 2008-14457 (JP 2008-14457 A). JP 2008-14457 A describes a technique for establishing a semi-interlock state by half-engaging an engagement device, which is different from an engagement device required to establish a current speed stage and is interlocked when engaged, at a predetermined torque capacity in order to reduce vehicle vibration caused by the torsional resonance of a driveline in a state where a lockup clutch is engaged.

Incidentally, in the technique described in JP 2008-14457 A, when the speed stage of the automatic transmission is a first speed stage or a second speed stage, the semi-interlock state is established by half-engaging a clutch for establishing a third speed stage or a fourth speed stage, which is a higher vehicle speed-side speed stage. In this case, drivability may deteriorate because load acts in a direction to reduce the input shaft rotation speed of the automatic transmission, that is, because torque internally circulates. That is, if the semi-interlock state is uniformly established in order to reduce vehicle vibration or noise, drivability may be deteriorated.

SUMMARY

The present disclosure provides a control apparatus for a power transmission system, which is able to prevent or reduce deterioration of drivability at the time of reducing vehicle vibration or noise.

An aspect of the present disclosure provides a control apparatus for a power transmission system including an automatic transmission that transmits power of a driving force source to a drive wheel and selectively establish one of a first power transmission path and a second power transmission path. The control apparatus includes an electronic control unit. The electronic control unit is configured to: (i) determine whether a state of a vehicle is a predetermined state of the vehicle where a vibration of the vehicle occurs, (ii) when the state of the vehicle is the predetermined state of the vehicle while the vehicle is traveling in a state where the first power transmission path is established, half-engage an engagement device configured to establish the second power transmission path while the first power transmission path remains established, (iii) when the state of the vehicle is the predetermined state of the vehicle while the vehicle is traveling in the state where the first power transmission path is established, alternatively set, in response to a traveling state of the vehicle, a speed ratio of the second power transmission path to one of a lower vehicle speed-side speed ratio with respect to a speed ratio of the first power transmission path and a higher vehicle speed-side speed ratio with respect to the speed ratio of the first power transmission path.

With the above-described control apparatus, when the state of the vehicle is the predetermined state of the vehicle where a vibration of the vehicle occurs, weak circulating torque is generated to fill the backlash inside the automatic transmission and in the power transmission path by half-engaging the engagement device configured to establish the second power transmission path while the first power transmission path remains established in the automatic transmission. Thus, it is possible to reduce a vibration of the vehicle or noise resulting from the vibration of the vehicle. At this time, because the speed ratio of the second power transmission path is alternatively set to one of the lower vehicle speed-side speed ratio with respect to the speed ratio of the first power transmission path and the higher vehicle speed-side speed ratio with respect to the speed ratio of the first power transmission path in response to the traveling state. Therefore, it is possible to generate weak circulating torque in a direction to increase the input shaft rotation speed of the automatic transmission or in a direction to reduce the input shaft rotation speed of the automatic transmission (that is, to fill the backlash) in accordance with the traveling state, such as a state where the vehicle is accelerating, a state where the vehicle is decelerating and a state where the vehicle is traveling on an uphill or a downhill. Thus, at the time of reducing a vibration of the vehicle or noise, it is possible to prevent or reduce deterioration of drivability.

In the control apparatus for a power transmission system, the electronic control unit may be configured to: (i) determine whether the traveling state is one of a drive state and a driven state, (ii) when the traveling state is the drive state, set the speed ratio of the second power transmission path to the lower vehicle speed-side speed ratio with respect to the speed ratio of the first power transmission path, and (iii) when the traveling state is the driven state, set the speed ratio of the second power transmission path to the higher vehicle speed-side speed ratio with respect to the speed ratio of the first power transmission path.

With the above-described control apparatus, when the traveling state is the drive state, the speed ratio of the second power transmission path is set to the lower vehicle speed-side speed ratio with respect to the speed ratio of the first power transmission path. Therefore, it is possible to generate weak circulating torque in a direction to increase the input shaft rotation speed of the automatic transmission (that is, to fill the backlash). On the other hand, when the traveling state is the driven state, the speed ratio of the second power transmission path is set to the higher vehicle speed-side speed ratio with respect to the speed ratio of the first power transmission path. Therefore, it is possible to generate weak circulating torque in a direction to reduce the input shaft rotation speed of the automatic transmission (that is, to fill the backlash).

In the control apparatus for a power transmission system, the automatic transmission may include a transmission mechanism, a continuously variable transmission mechanism, a first engagement device and a second engagement device. The transmission mechanism and the continuously variable transmission mechanism may be provided in parallel with each other in a power transmission path between an input rotating member to which power of the driving force source is transmitted and an output rotating member that outputs the power to the drive wheel, so as to establish a speed stage. The first engagement device may be configured to establish the first power transmission path in which the transmission mechanism is interposed. The second engagement device may be configured to establish the second power transmission path in which the continuously variable transmission mechanism is interposed. The electronic control unit may be configured to set the speed ratio of the second power transmission path to one of the lower vehicle speed-side speed ratio with respect to the speed ratio of the first power transmission path and the higher vehicle speed-side speed ratio with respect to the speed ratio of the first power transmission path by setting a speed ratio of the continuously variable transmission mechanism to one of a lower vehicle speed-side speed ratio with respect to the speed ratio established in the first power transmission path and a higher vehicle speed-side speed ratio with respect to the speed ratio established in the first power transmission path.

With the above-described control apparatus, by setting the speed ratio of the continuously variable transmission mechanism to one of the lower vehicle speed-side speed ratio and the higher vehicle speed-side speed ratio, it is possible to alternatively set, in response to the traveling state, the speed ratio of the second power transmission path to one of the lower vehicle speed-side speed ratio with respect to the speed ratio of the first power transmission path and the higher vehicle speed-side speed ratio with respect to the speed ratio of the first power transmission path. At this time, because the speed ratio of the second power transmission path is allowed to be steplessly adjusted, it is possible to exert inertia suitable for the state of the vehicle. That is, it is possible to generate weak circulating torque commensurate with the traveling state. That is, it is possible to cause a weak tie-up state without intricately adjusting engaging force for half-engaging the engagement device for establishing the second power transmission path.

In the control apparatus for a power transmission system, the automatic transmission may be a stepped transmission in which a plurality of speed stages are selectively established by engaging a predetermined engagement device. The electronic control unit may be configured to set the speed ratio of the second power transmission path to one of the lower vehicle speed-side speed ratio with respect to the speed ratio of the first power transmission path and the higher vehicle speed-side speed ratio with respect to the speed ratio of the first power transmission path by setting a speed stage that is established in the second power transmission path to one of a lower vehicle speed-side speed stage and a higher vehicle speed-side speed stage with respect to a currently established speed stage of the second power transmission path.

With the above-described control apparatus, by setting the speed stage that is established in the second power transmission path to one of the lower vehicle speed-side speed stage and the higher vehicle speed-side speed stage with respect to the currently established speed stage, it is possible to easily alternatively set in response to the traveling state the speed ratio of the second power transmission path to one of the lower vehicle speed-side speed ratio with respect to the speed ratio of the first power transmission path and the higher vehicle speed-side speed ratio with respect to the speed ratio of the first power transmission path.

In the control apparatus for a power transmission system, the electronic control unit may be configured to change the state of the vehicle based on an auxiliary load.

With the above-described control apparatus, the state of the vehicle is changed based on the auxiliary load that influences the magnitude of actual power of the driving force source, which is transmitted to the first power transmission path. Therefore, the state of the vehicle where a vibration of the vehicle or noise resulting from the vibration of the vehicle occurs is appropriately determined, The vibration determination unit may be configured to determine whether the vehicle is in a vibration generating state based on whether at least one of a rotation variation or rotation variation angular acceleration of an input shaft rotation speed of the automatic transmission is larger than or equal to a predetermined threshold. Here, at least one of the rotation variation or the rotation variation angular acceleration is calculated based on at least one of an engine rotation speed, a vehicle speed and an estimated input torque of the automatic transmission. The vibration determination unit may be configured to determine whether the vehicle is in a vibration generating state based on whether at least one of an engine rotation speed, a vehicle speed and an estimated input torque of the automatic transmission is larger than or equal to a corresponding one of respectively set predetermined thresholds, With the above-described control apparatus, it is possible to accurately determine whether the vehicle is in the vibration generating state, so it is possible to appropriately determine the state of the vehicle where a vibration of the vehicle is occurring or noise resulting from the vibration of the vehicle is occurring.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings.

Figure 1:
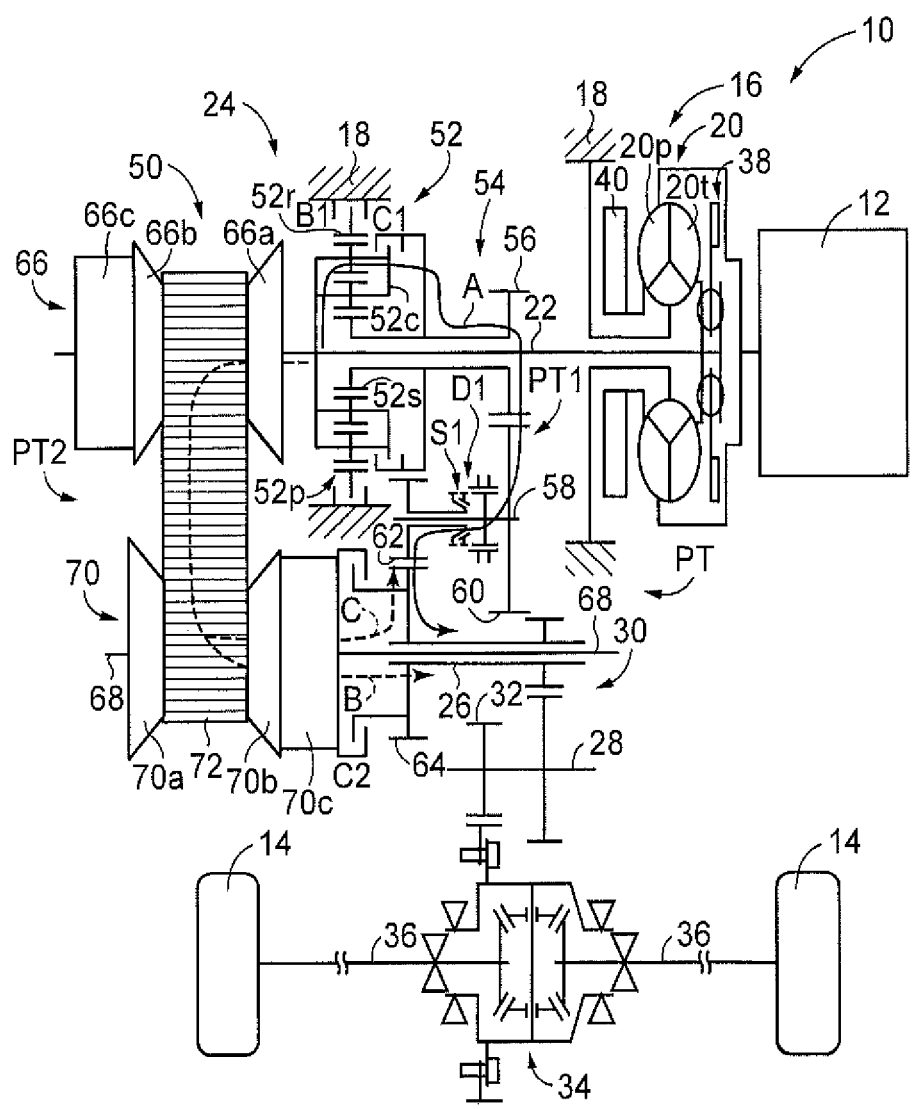
FIG. 1 is a view that illustrates the schematic configuration of a vehicle to which a first embodiment of the present disclosure is applied.

FIG. 1 is a view that illustrates the schematic configuration of a vehicle 10 to which a first embodiment of the present disclosure is applied. In FIG. 1, the vehicle 10 includes an engine 12, drive wheels 14, and a power transmission system 16. The engine 12 is a gasoline engine, a diesel engine, or the like, that functions as a driving force source for propelling the vehicle 10. The power transmission system 16 is provided in a power transmission path between the engine 12 and the drive wheels 14. The power transmission system 16 includes a torque converter 20, an input shaft 22, an automatic transmission 24, an output shaft 26, a counter shaft 28, a reduction gear unit 30, a differential gear set 34, a pair of axles 36, and the like. The input shaft 22 is coupled to the torque converter 20. The automatic transmission 24 is coupled to the input shaft 22. The output shaft 26 is coupled to the output side of the automatic transmission 24. The pair of axles 36 are coupled to the differential gear set 34. The torque converter 20 is known as a fluid transmission device coupled to the engine 12 inside a housing 18 that serves as a non-rotating member. The reduction gear unit 30 includes a pair of meshing gears. The pair of meshing gears are respectively provided on the output shaft 26 and the counter shaft 28 so as to be relatively non-rotatable. The differential gear set 34 is coupled to a gear 32. The gear 32 is provided on the counter shaft 28 so as to be relatively non-rotatable. In the thus configured power transmission system 16, the power (when not specifically distinguished from one another, power is synonymous with torque and force) of the engine 12 is transmitted to the pair of drive wheels 14 sequentially via the torque converter 20, the automatic transmission 24, the reduction gear unit 30, the differential gear set 34, the axles 36, and the like.

The torque converter 20 is interposed in a power transmission path between the engine 12 and the input shaft 22. The torque converter 20 is provided around the input shaft 22 coaxial with the input shaft 22. The torque converter 20 includes a pump impeller 20p and a turbine runner 20t. The pump impeller 20p is coupled to the engine 12. The turbine runner 20t is coupled to the input shaft 22. The torque converter 20 transmits the power of the engine 12 to the input shaft 22. The torque converter 20 includes a known lockup clutch 38. The lockup clutch 38 is able to directly couple the pump impeller 20p and the turbine runner 20t to each other, that is, the input and output rotating members of the torque converter 20 to each other. The power transmission system 16 includes a mechanical oil pump 40 coupled to the pump impeller 20p. The oil pump 40 generates (discharges) hydraulic pressure for shift control over the automatic transmission 24 or supplying lubricating oil to portions of the power transmission system 16 by being driven by the engine 12 to rotate, The automatic transmission 24 includes a known belt-type continuously variable transmission (CVT) 50, a forward/reverse switching device 52 and a gear transmission mechanism 54. The continuously variable transmission 50 serves as a continuously variable transmission mechanism coupled to the input shaft 22. The forward/reverse switching device 52 is similarly coupled to the input shaft 22. The gear transmission mechanism 54 serves as a transmission mechanism coupled to the input shaft 22 via the forward/reverse switching device 52 and provided in parallel with the continuously variable transmission 50. That is, the automatic transmission 24 includes the gear transmission mechanism 54 and the continuously variable transmission 50. The gear transmission mechanism 54 and the continuously variable transmission 50 are provided in a power transmission path PT in parallel with each other between the engine 12 (which is synonymous with the input shaft 22 that is an input rotating member to which the power of the engine 12 is transmitted) and the drive wheels 14 (which is synonymous with the output shaft 26 that is an output rotating member that outputs the power of the engine 12 to the drive wheels 14).

Thus, the power transmission system 16 includes the plurality of power transmission paths, that is, a first power transmission path PT1 and a second power transmission path PT2, in parallel with each other between the input shaft 22 and the output shaft 26. The first power transmission path PT1 transmits the power of the engine 12 from the input shaft 22 to the drive wheels 14 side (that is, the output shaft 26) via the gear transmission mechanism 54. The second power transmission path PT2 transmits the power of the engine 12 from the input shaft 22 to the drive wheels 14 side (that is, the output shaft 26) via the continuously variable transmission 50. The power transmission system 16 is configured to change the power transmission path between the first power transmission path PT1 and the second power transmission path PT2 on the basis of the traveling state of the vehicle 10, Therefore, the automatic transmission 24 includes a plurality of engagement devices that selectively change the power transmission path, which transmits the power of the engine 12 to the drive wheels 14 side, between the first power transmission path PT1 and the second power transmission path PT2. The engagement devices include a first clutch C1, a first brake B1 and a second clutch C2. The first clutch C1 and the first brake B1 each serve as a first engagement device that connects or interrupts the first power transmission path PT1. The second clutch C2 serves as a second engagement device that connects or interrupts the second power transmission path PT2. The first engagement device is, in other words, an engagement device for, when engaged, establishing the first power transmission path PT1 in which the gear transmission mechanism 54 is interposed. The second engagement device is, in other words, an engagement device for, when engaged, establishing the second power transmission path PT2 in which the continuously variable transmission 50 is interposed. The first clutch C1, the first brake B1 and the second clutch C2 correspond to a separating device. Each of the first clutch C1, the first brake B1 and the second clutch C2 is a known hydraulic wet-type friction engagement device (friction clutch) that is frictionally engaged by a hydraulic actuator. As will be described later, each of the first clutch C1 and the first brake B1 is one of elements that constitute the forward/reverse switching device 52, The forward/reverse switching device 52 is provided around the input shaft 22 coaxially with the input shaft 22 in the first power transmission path PT1. The forward/reverse switching device 52 includes a double-pinion planetary gear train 52p, the first clutch C1 and the first brake B1. The planetary gear train 52p is a differential mechanism including three rotating elements, that is, a carrier 52c, a sun gear 52s and a ring gear 52r, The carrier 52c serves as an input element. The sun gear 52s serves as an output element. The ring gear 52r serves as a reaction element. The carrier 52e is integrally coupled to the input shaft 22. The ring gear 52r is selectively coupled to the housing 18 via the first brake B1. The sun gear 52s is coupled to a small-diameter gear 56. The small-diameter gear 56 is provided around the input shaft 22 coaxially with the input shaft 22 so as to be relatively rotatable. The carrier 52e and the sun gear 52s are selectively coupled to each other via the first clutch C1 Thus, the first clutch C1 is an engagement device that selectively couples two of the three rotating elements to each other, and the first brake B1 is an engagement device that selectively couples the reaction element to the housing 18.

The gear transmission mechanism 54 includes the small-diameter gear 56, a gear mechanism counter shaft 58, and a large-diameter gear 60. The large-diameter gear 60 is provided around the gear mechanism counter shaft 58 coaxially with the gear mechanism counter shaft 58 so as to be relatively non-rotatable. The large-diameter gear 60 is in mesh with the small-diameter gear 56. The gear transmission mechanism 54 includes an idler gear 62 and an output gear 64. The idler gear 62 is provided around the gear mechanism counter shaft 58 coaxially with the gear mechanism counter shaft 58 so as to be relatively rotatable. The output gear 64 is provided around the output shaft 26 coaxially with the output shaft 26 so as to be relatively non-rotatable. The output gear 64 is in mesh with the idler gear 62. The output gear 64 has a larger diameter than the idler gear 62. Therefore, the gear transmission mechanism 54 is a transmission mechanism having a speed ratio (speed stage) as a predetermined speed ratio (speed stage, gear stage) in the power transmission path PT between the input shaft 22 and the output shaft 26. The gear transmission mechanism 54 further includes a dog clutch D1. The dog clutch D1 is provided around the gear mechanism counter shaft 58 between the large-diameter gear 60 and the idler gear 62. The dog clutch D1 selectively connects the large-diameter gear 60 to the idler gear 62 or disconnects the large-diameter gear 60 from the idler gear 62. The dog clutch D1 is arranged in the power transmission path between the forward/reverse switching device 52 (which is synonymous with the first clutch C1) and the output shaft 26 (in other words, the dog clutch D1 is provided on the output shaft 26 side with respect to the first clutch C1). The dog clutch D1 functions as a third engagement device that connects or interrupts the first power transmission path PT1. The dog clutch D1 is included in the plurality of engagement devices. In other words, the third engagement device is an engagement device for establishing the first power transmission path PT1 when engaged together with the first clutch C1. The dog clutch D1 includes a known synchromesh mechanism S1 that serves as a synchronization mechanism. The synchromesh mechanism S1 synchronizes rotations at the time when the dog clutch D1 is engaged by a hydraulic actuator.

The first power transmission path PT1 is established when both the dog clutch D1 and the first clutch C1 (or the first brake B1) provided on the input shaft 22 side with respect to the dog clutch D1 are engaged. When the first clutch C1 is engaged, a forward power transmission path is established. When the first brake B1 is engaged, a reverse power transmission path is established. When the first power transmission path PT1 is established, the power transmission system 16 is set to a power transmittable state where the power of the engine 12 is allowed to be transmitted from the input shaft 22 to the output shaft 26 via the gear transmission mechanism 54. On the other hand, when at least both the first clutch C1 and the first brake B1 are released or at least the dog clutch D1 is released, the first power transmission path PT1 is set to a neutral state (power transmission interrupted state) where transmission of power is interrupted.

The continuously variable transmission 50 is a belt-type continuously variable transmission mechanism. The continuously variable transmission 50 includes a primary pulley 66, a secondary pulley 70 and a transmission belt 72. The primary pulley 66 is provided on the input shaft 22, and has a variable effective diameter. The secondary pulley 70 is provided on a rotary shaft 68 coaxial with the output shaft 26, and has a variable effective diameter. The transmission belt 72 is wound around the pulleys 66, 70 so as to span between the pulleys 66, 70. Power is transmitted via a friction force (belt clamping force) between the pair of pulleys 66, 70 and the transmission belt 72. In the primary pulley 66, a hydraulic pressure that is supplied to the primary pulley 66 (that is, a primary pressure Pin that is supplied to a primary hydraulic cylinder 66c) is regulated by a hydraulic control circuit 74 (see FIG. 3) that is driven by an electronic control unit 80 (see FIG. 3), with the result that a primary thrust Win (=Primary pressure Pin×Pressure receiving area) that changes the V-groove width between sheaves 66a, 66b is applied. In the secondary pulley 70, a hydraulic pressure that is supplied to the secondary pulley 70 (that is, a secondary pressure Pout that is supplied to a secondary hydraulic cylinder 70c) is regulated by the hydraulic control circuit 74, with the result that a secondary thrust Wout (=Secondary pressure Pout×Pressure receiving area) that changes the V-groove width between sheaves 70a, 70b is applied. In the continuously variable transmission 50, when the primary thrust Win (primary pressure Pin) and the secondary thrust Wout (secondary pressure Pout) each are controlled, the V-groove width of each of the pulleys 66, 70 changes, and the winding diameter (effective diameter) of the transmission belt 72 is changed. As a result, a speed ratio γcvt (=Primary pulley rotation speed Npri/Secondary pulley rotation speed Nsec) is changed, and a friction force between each of the pulleys 66, 70 and the transmission belt 72 is controlled such that no slip of the transmission belt 72 occurs.

The output shaft 26 is arranged around the rotary shaft 68 coaxially with the rotary shaft 68 so as to be relatively rotatable. The second clutch C2 is provided on the drive wheels 14 (which are synonymous with the output shaft 26) side with respect to the continuously variable transmission 50 (that is, the second clutch C2 is provided between the secondary pulley 70 and the output shaft 26). The second clutch C2 selectively connects or interrupts the power transmission path between the secondary pulley 70 (rotary shaft 68) and the output shaft 26. The second power transmission path PT2 is established when the second clutch C2 is engaged. When the second power transmission path PT2 is established, the power transmission system 16 is set to a power transmittable state where the power of the engine 12 is allowed to be transmitted from the input shaft 22 to the output shaft 26 via the continuously variable transmission 50. On the other hand, the second power transmission path PT2 is set to a neutral state when the second clutch C2 is released.

Figure 2:
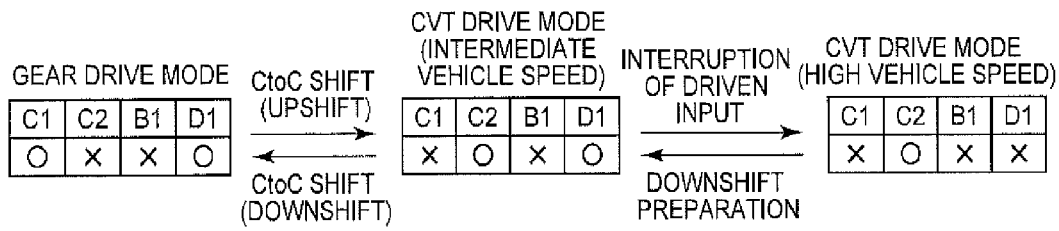
FIG. 2 is a chart for illustrating changes in drive mode of a power transmission system shown in FIG. 1.

The operation of the power transmission system 16 will be described below. FIG. 2 is a view for illustrating changes in drive mode of the power transmission system 16 by using an engagement chart of the engagement devices for each driving pattern (drive mode) that is changed by the electronic control unit 80. In FIG. 2, C1 corresponds to the operation state of the first clutch C1, C2 corresponds to the operation state of the second clutch C2, 131 corresponds to the operation state of the first brake B1, D1 corresponds to the operation state of the dog clutch D1, the circle mark indicates an engaged (connected) state, and the cross mark indicates a released (disconnected) state.

In FIG. 2, in gear drive mode that is the drive mode in which the power of the engine 12 is transmitted to the output shaft 26 via the gear transmission mechanism 54 (that is, via the first power transmission path PT1) (that is the drive mode in which the vehicle 10 travels by using the first power transmission path PT1 in which the gear transmission mechanism 54 is interposed), the first clutch C1 and the dog clutch D1 are engaged, and the second clutch C2 and the first brake B1 are released. In the gear drive mode, forward traveling is enabled. In the gear drive mode in which the first brake B1 and the dog clutch D1 are engaged and the second clutch C2 and the first clutch C1 are released, reverse traveling is enabled.

In CVT drive mode (also referred to as belt drive mode) that is the drive mode in which the power of the engine 12 is transmitted to the output shaft 26 via the continuously variable transmission 50 (that is, via the second power transmission path PT2) (that is the drive mode in which the vehicle 10 travels by using the second power transmission path PT2 in which the continuously variable transmission 50 is interposed), the second clutch C2 is engaged, and the first clutch C1 and the first brake B1 are released. In the CVT drive mode, forward traveling is enabled. Within the CVT drive mode, the dog clutch D1 is engaged in the CVT drive mode (intermediate vehicle speed); whereas the dog clutch D1 is released in the CVT drive mode (high vehicle speed). The reason why the dog clutch D1 is released in the CVT drive mode (high vehicle speed) is to, for example, eliminate a drag of the gear transmission mechanism 54, and the like, during traveling in the CVT drive mode and prevent high-speed rotation of the gear transmission mechanism 54, the constituent members (for example, pinion gears) of the planetary gear train 52p, and the like, at a high vehicle speed. The dog clutch D1 functions as a driven input interrupting clutch that interrupts input from the drive wheels 14 side.

The gear drive mode is, for example, selected in a low vehicle speed region including a state during a stop of the vehicle. The CVT drive mode is, for example, selected in an intermediate vehicle speed region or a high vehicle speed region. Therefore, in the power transmission system 16, a speed ratio $\gamma$gear that is established by the first power transmission path PT1 (that is, the speed ratio of the gear path) is set to a value appropriate for starting the vehicle. In the power transmission system 16, a speed ratio $\gamma$cvt that is established by the second power transmission path PT2 (that is, the speed ratio of the CVT path, which is the speed ratio of the continuously variable transmission 50) is set so as to include at least a value appropriate for traveling at an intermediate and high vehicle speed, that is, a value smaller than the speed ratio $\gamma$gear of the gear path (that is, a higher vehicle speed-side speed ratio or a higher speed ratio). As will be described later, as for the speed ratio $\gamma$cvt of the continuously variable transmission 50, a value slightly larger than the speed ratio near of the gear path (that is, a lower vehicle speed-side speed ratio or a lower speed ratio) is set to the lowest speed ratio $\gamma$max that is the lowest vehicle speed-side speed ratio that is established by the continuously variable transmission 50. The speed ratio $\gamma$cvt lower than the speed ratio $\gamma$gear of the gear path is not used when the vehicle 10 travels in the CVT drive mode. When the vehicle 10 travels in the CVT drive mode, the speed ratio $\gamma$cvt higher than the speed ratio $\gamma$gear of the gear path is used.

The speed ratio near corresponds to a first-speed speed ratio $\gamma$1 that is the speed ratio $\gamma$ of the first speed stage in the power transmission system 16. The lowest vehicle speed-side speed ratio within the range of the speed ratio $\gamma$cvt that is used when the vehicle 10 travels in the CVT drive mode corresponds to a second-speed speed ratio $\gamma$2 that is the speed ratio $\gamma$ of the second speed stage in the power transmission system 16. Therefore, for example, the gear drive mode and the CVT drive mode are changed in accordance with a shift line for changing the speed stage between the first speed stage and the second speed stage in a shift map of a known stepped transmission. In the CVT drive mode, a shift to change the speed ratio $\gamma$cvt is carried out on the basis of a traveling state, such as an accelerator operation amount $\theta$acc and a vehicle speed V, by using, for example, a known technique.

In changing the drive mode from the gear drive mode to the CVT drive mode (high vehicle speed) or changing the drive mode from the CVT drive mode (high vehicle speed) to the gear drive mode, the change is carried out via the CVT drive mode (intermediate vehicle speed) as shown in FIG. 2. For example, when the drive mode is changed from the gear drive mode to the CVT drive mode (high vehicle speed), the drive mode is changed to the CVT drive mode (intermediate vehicle speed) by upshifting through a shift for changing the engaged clutch (for example, clutch-to-clutch shift (hereinafter, referred to as CtoC shift)) so as to release the first clutch C1 and engage the second clutch C2. After that, the dog clutch D1 is released in order to interrupt driven input. For example, when the drive mode is changed from the CVT drive mode (high vehicle speed) to the gear drive mode, the drive mode is changed to the CVT drive mode (intermediate vehicle speed) by engaging the dog clutch D1 in preparation for changing the drive mode to the gear drive mode (that is, downshift preparation). After that, a downshift is carried out through a shift for changing the engaged clutch (for example, CtoC shift) so as to release the second clutch C2 and engage the first clutch C1.

Figure 3:
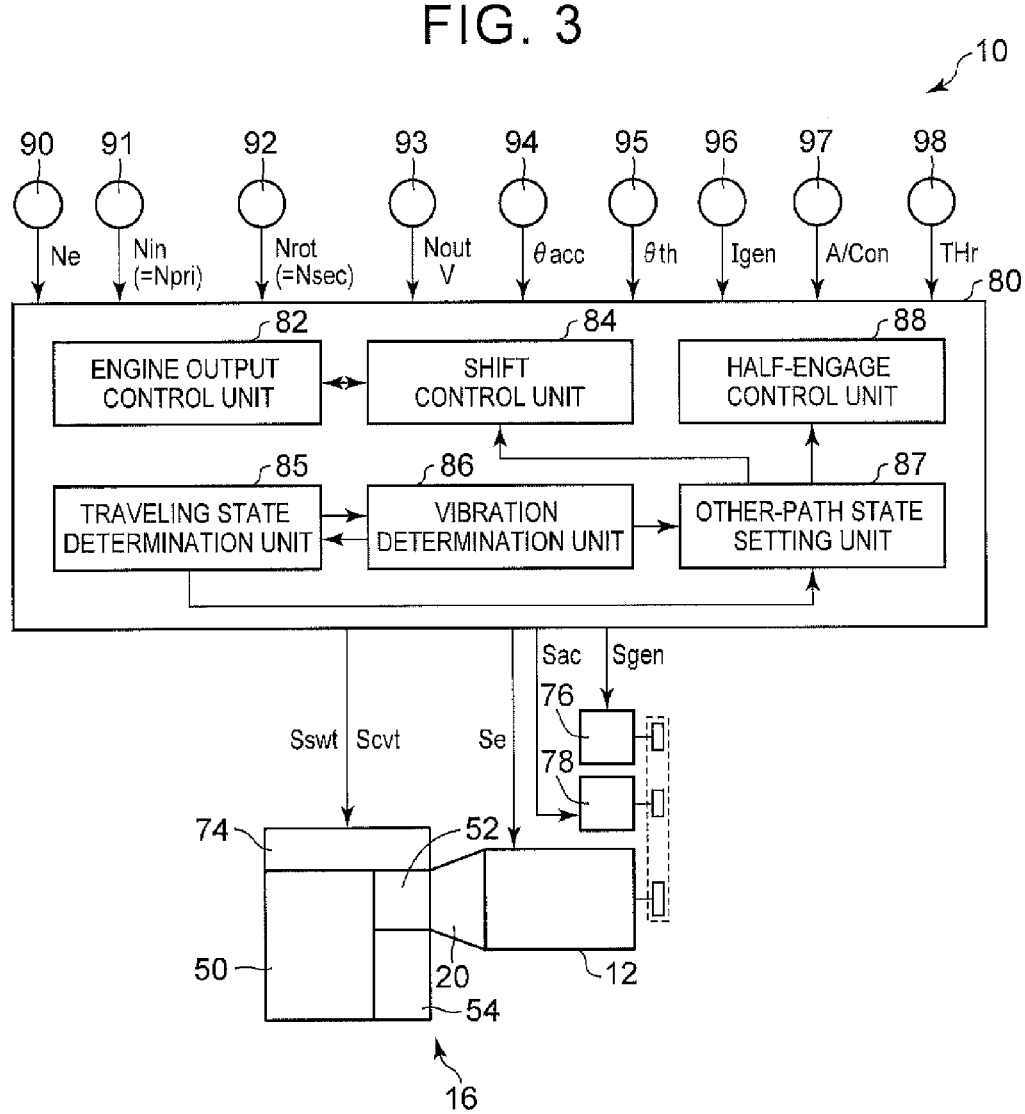
FIG. 3 is a view that illustrates a relevant portion of control functions and control system for various controls in the vehicle.

FIG. 3 is a view that illustrates a relevant portion of control functions and control system for various controls in the vehicle 10. As shown in FIG. 3, the vehicle 10 includes, for example, the electronic control unit 80 including a control apparatus for the power transmission system 16. Thus, FIG. 3 is a view that shows input/output lines of the electronic control unit 80, and is a functional block diagram that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 12, control for shifting the continuously variable transmission 50, control for changing the drive mode of the power transmission system 16, and the like. Where necessary, the electronic control unit 80 is split into an electronic control unit for controlling the engine, an electronic control unit for controlling hydraulic pressure, and the like. The vehicle 10 further includes auxiliaries that operate by using the power of the engine 12. The auxiliaries, for example, include an alternator 76 coupled to the engine 12 via a belt, or the like, and an air-conditioner compressor 78 coupled to the engine 12 via a belt, an electromagnetic clutch (not shown), and the like. The auxiliaries are driven by the engine 12. While the alternator 76 is generating electric power, load due to the operation of the alternator 76 occurs in the engine 12. While the electromagnetic clutch is in an engaged state, load due to the operation of the air-conditioner compressor 78 occurs in the engine 12.

Various actual values based on detection signals of various sensors of the vehicle 10 are supplied to the electronic control unit 80. The various sensors include, for example, various rotation speed sensors 90, 91, 92, 93, an accelerator operation amount sensor 94, a throttle opening degree sensor 95, a current sensor 96, an air-conditioner switch 97 for activating an air conditioner, an internal air sensor 98, and the like. The various actual values include, for example, an engine rotation speed Ne, an input shaft rotation speed Nin that is a primary pulley rotation speed Npri, a rotary shaft rotation speed Nrot that is a secondary pulley rotation speed Nsec, an output shaft rotation speed Nout corresponding to a vehicle speed V, an accelerator operation amount θacc, a throttle valve opening degree θth, a generated current Igen of the alternator 76, an air-conditioner on signal A/Con indicating that the air-conditioner compressor 78 is operating, a room temperature THr indicating an air temperature in a vehicle cabin, and the like.

Various output signals are supplied from the electronic control unit 80 to the devices provided in the vehicle 10. The devices include, for example, the engine 12, the hydraulic control circuit 74, the alternator 76, the air-conditioner compressor 78, the electromagnetic clutch, and the like. The various output signals include, for example, an engine output control command signal Se, a hydraulic pressure control command signal Scvt, a hydraulic pressure control command signal Sswt, a generated voltage command signal Sgen, an air-conditioner control command signal Sac, and the like. The engine output control command signal Se is used to control the output of the engine 12. The hydraulic pressure control command signal Scvt is used to control hydraulic pressures associated with a shift of the continuously variable transmission 50. The hydraulic pressure control command signal Sswt is used to control the first clutch C1, the first brake B1, the second clutch C2 and the dog clutch D1 associated with a change of the drive mode of the power transmission system 16. The generated voltage command signal Sgen is used to control a power generation state of the alternator 76. The air-conditioner control command signal Sac is used to drive the air-conditioner compressor 78 by setting the electromagnetic clutch to the engaged state or control the capacity of the air-conditioner compressor 78 on the basis of the room temperature THr, or the like.

The electronic control unit 80 includes an engine output control unit 82 and a shift control unit 84.

The engine output control unit 82, for example, (i) calculates a required driving force Fdem by applying the accelerator operation amount θacc and the vehicle speed V to a relationship (for example, a driving force map) empirically obtained or obtained by design and stored in advance (that is, predetermined), (ii) sets a target engine torque Tetgt by which the required driving force Fdem is obtained, and (iii) outputs, to a throttle actuator, a fuel injection device, an ignition device, and the like, the engine output control command signal Se for output control over the engine 12 such that the target engine torque Tetgt is obtained.

During a stop of the vehicle, the shift control unit 84 outputs, to the hydraulic control circuit 74, a command to engage the dog clutch D1 in preparation for the gear drive mode. After that, at the time when the shift lever is shifted into the forward drive position D (or the reverse drive position R), the shift control unit 84 outputs, to the hydraulic control circuit 74, a command to engage the first clutch C1 (or the first brake B1), The shift control unit 84 controls a change of the drive mode between the gear drive mode and the CVT drive mode. Specifically, for example, the shift control unit 84 determines whether to change the speed ratio γ by applying the vehicle speed V and the accelerator operation amount θacc to shift lines (an upshift line and a downshift line with a predetermined hysteresis) for changing the speed ratio γ between the speed ratio γgear of the gear path in the gear drive mode (that is, the first speed stage in the power transmission system 16) and the lowest vehicle speed-side speed ratio that is used when the vehicle 10 travels in the CVT drive mode (that is, the second speed stage in the power transmission system 16), and changes the drive mode on the basis of the determined result.

When the shift control unit 84 determines to upshift during traveling in the gear drive mode and changes the drive mode from the gear drive mode to the CVT drive mode (intermediate vehicle speed), the shift control unit 84 outputs, to the hydraulic control circuit 74, a command to carry out a CtoC shift for releasing the first clutch C1 and engaging the second clutch C2. Thus, the power transmission path PT in the power transmission system 16 is changed from the first power transmission path PT1 to the second power transmission path PT2. When the shift control unit 84 changes the drive mode from the CVT drive mode (intermediate vehicle speed) to the CVT drive mode (high vehicle speed), the shift control unit 84 outputs, to the hydraulic control circuit 74, a command to release the dog clutch D1. When the shift control unit 84 changes the drive mode from the CVT drive mode (high vehicle speed) to the CVT drive mode (intermediate vehicle speed), the shift control unit 84 outputs, to the hydraulic control circuit 74, a command to engage the dog clutch D1. When the shift control unit 84 determines to downshift during traveling in the CVT drive mode (intermediate vehicle speed) and changes the drive mode to the gear drive mode, the shift control unit 84 outputs, to the hydraulic control circuit 74, a command to carry out a CtoC shift for releasing the second clutch C2 and engaging the first clutch C1. Thus, the power transmission path PT in the power transmission system 16 is changed from the second power transmission path PT2 to the first power transmission path PT1. In change control for changing the drive mode between the gear drive mode and the CVT drive mode, the change is carried out via the CVT drive mode (intermediate vehicle speed), so the first power transmission path PT1 and the second power transmission path PT2 are changed only by exchanging torque through a CtoC shift. Therefore, change shock is reduced.

The shift control unit 84 calculates a target input shaft rotation speed Nintgt by, for example, applying the accelerator operation amount θacc and the vehicle speed V to a predetermined relationship (for example, a CVT shift map) in the CVT drive mode. The shift control unit 84 calculates a target speed ratio γcvagt (=Nintgt/Nsec) of the continuously variable transmission 50 on the basis of the target input shaft rotation speed Nintgt. The shift control unit 84 controls the speed ratio γcvt of the continuously variable transmission 50 on the basis of the target speed ratio γcvttgt (that is, controls a shift of the continuously variable transmission 50). Specifically, the shift control unit 84 (i) determines hydraulic pressure commands (hydraulic pressure control command signal Scvt) of the primary pressure Pin and secondary pressure Pout for achieving the target speed ratio γcvttgt, and (ii) carries out a CVT shift by outputting those hydraulic commands to the hydraulic control circuit 74. The CVT shift map is, for example, set in advance such that the target speed ratio γcvttgt of the continuously variable transmission 50, at which the engine 12 is operated along a predetermined optimal line (for example, an engine optimal fuel consumption line), is calculated.

In order to improve fuel economy, it is suggested that a region in which the lockup clutch 38 is placed in an engaged state or a slipped state is expanded to a low rotation region of the engine rotation speed Ne or a low vehicle speed region of the vehicle speed V. When the vehicle 10 travels at a low vehicle speed, a low engine rotation speed and a low load while the engine 12 and the automatic transmission 24 are in a directly coupled state (or a state close to the directly coupled state) as a result of engagement of the lockup clutch 38, or the like, a vibration of the vehicle easily occurs. This is because, in such a case, if a large rotation variation of the engine 12 is input to the automatic transmission 24 and is transmitted to backlash (clearance) provided in a meshing portion, such as a meshed portion or spline-fitted portion of the gears of the power transmission path PT and a play portion between a friction plate and clutch hub of each engagement device, and, in the meshing portion, tooth flanks repeatedly collide with or separate from each other. Accordingly, rattling sound (tooth hammer sound) occurs at the meshing portion of the power transmission path PT, with the result that an occupant may feel discomfort.

In a predetermined traveling state where a vibration of the vehicle occurs during traveling in a state where one of the first power transmission path PT1 and the second power transmission path PT2 is established, the electronic control unit 80 half-engages the engagement device for establishing the other power transmission path while the one power transmission path remains established. Thus, it is possible to fill the backlash inside the automatic transmission 24 and the backlash of the one power transmission path by circulating torque from the other power transmission path to the one power transmission path. Thus, it is possible to reduce a vibration of the vehicle or noise resulting from the vibration of the vehicle.

Incidentally, torque circulates in a direction to reduce the rotation speed of the input shaft 22 when the speed ratio of the other power transmission path is higher than the speed ratio of the one power transmission path; whereas torque circulates in a direction to increase the rotation speed of the input shaft 22 when the speed ratio of the other power transmission path is lower than the speed ratio of the one power transmission path. Then, if the direction in which the rotation speed of the input shaft 22 changes as a result of torque circulation does not match the traveling state, such as a state where the vehicle 10 is accelerating, a state where the vehicle 10 is decelerating and a state where the vehicle 10 is traveling on an uphill or downhill, there is a concern that drivability deteriorates. Therefore, when the speed ratio of the other power transmission path is allowed to be set so as to be higher or lower than the speed ratio of the one power transmission path, it is desirable to half-engage the engagement device for establishing the other power transmission path in a state where the speed ratio of the other power transmission path is set to a speed ratio commensurate with the current traveling state. In consideration of the above, in the automatic transmission 24, as for the speed ratio γevt of the continuously variable transmission 50, a speed ratio slightly lower than the speed ratio γgear of the gear path is set for the lowest speed ratio γmax.

More specifically, the electronic control unit 80 further includes a traveling state determination unit 85, a vibration determination unit 86, an other-path state setting unit 87 and a half-engage control unit 88.

The traveling state determination unit 85 determines whether the lockup clutch 38 is controlled to any one of an engaged state and a slipped state on the basis of, for example, a hydraulic pressure command value for operating the lockup clutch 38. The traveling state determination unit 85 determines whether the vehicle 10 is traveling in the gear drive mode in which the first clutch C1 is engaged (that is, whether the vehicle 10 is traveling in a state where the first power transmission path PT1 is established) on the basis of, for example, the hydraulic pressure control command signal Sswt associated with a change of the drive mode of the power transmission system 16. The traveling state determination unit 85 determines whether the vehicle 10 is traveling in the CVT drive mode in which the second clutch C2 is engaged (that is, whether the vehicle 10 is traveling in a state where the second power transmission path PT2 is established) on the basis of, for example, the hydraulic pressure control command signal Sswt associated with a change of the drive mode of the power transmission system 16.

The traveling state determination unit 85 determines whether the traveling state of the vehicle 10 is in a drive state or a driven state on the basis of, for example, a change in the throttle valve opening degree θth, a change in the vehicle speed V, and the like. In the present first embodiment, the drive state is, for example, assumed as a traveling state where, while the vehicle 10 is traveling on a flat road, driving force based on the power of the engine 12 substantially balances with traveling resistance and, as a result, the vehicle speed V is substantially constant, but the throttle valve opening degree θth tends to increase. The drive state is, for example, assumed as a traveling state where, while the vehicle 10 is traveling on an uphill, the vehicle speed V tends to decrease but the throttle valve opening degree θth is substantially constant or tends to increase. The driven state is, for example, assumed as a traveling state where, while the vehicle 10 is traveling on a flat road, the vehicle speed V is substantially constant but the throttle valve opening degree θth tends to decrease. The driven state is, for example, assumed as a traveling state where, while the vehicle 10 is traveling on a downhill, the vehicle speed V tends to increase but the throttle valve opening degree θth tends to decrease or is substantially zero.

The vibration determination unit 86 determines whether a state of the vehicle is a predetermined state of the vehicle where a vibration of the vehicle occurs. The state of the vehicle is a rotation variation ΔNin or rotation variation angular acceleration Nin' of the input shaft rotation speed Nin. The predetermined state of the vehicle is a state where the rotation variation ΔNin or rotation variation angular acceleration Nin' of the input shaft rotation speed Nin is larger than or equal to a predetermined threshold set in advance as a lower limit value at or above which a vibration of the vehicle (particularly, rattling sound of the driveline) occurs.

The vibration determination unit 86 calculates the rotation variation ΔNin or rotation variation angular acceleration Nin+ of the input shaft rotation speed Nin by applying the engine rotation speed Ne, the vehicle speed V and an estimated input torque Tine to a predetermined relationship (map) for calculating the rotation variation ΔNin or rotation variation angular acceleration Nin' of the input shaft rotation speed Nin. The vibration determination unit 86 determines whether the state of the vehicle is the predetermined state of the vehicle where a vibration of the vehicle occurs by determining whether the calculated rotation variation ΔNin or rotation variation angular acceleration Nin' of the input shaft rotation speed Nirt is larger than or equal to the predetermined threshold. A different value may be used as the predetermined threshold depending on whether the drive mode is the gear drive mode or the CVT drive mode. When the drive mode is the CVT drive mode, the rotation variation ΔNin or rotation variation angular acceleration Nin' of the input shaft rotation speed Nin is calculated further in consideration of the speed ratio γcyt of the continuously variable transmission 50.

The vibration determination unit 86 calculates an estimated engine torque Tee by applying the engine rotation speed Ne and the throttle valve opening degree θth to a predetermined known engine torque map. The vibration determination unit 86 calculates the estimated input torque Tine by multiplying the estimated engine torque Tee by a torque ratio t (=Turbine torque Tt/Pump torque Tp) of the torque converter 20. When the lockup clutch 38 is controlled to the engaged state, the vibration determination unit 86 sets the estimated engine torque Tee for the estimated input torque Tine.

The vibration determination unit 86 changes (corrects) the state of the vehicle (that is, the rotation variation ΔNin or rotation variation angular acceleration Nin' of the input shaft rotation speed Nin) on the basis of auxiliary load. The auxiliary load is a load torque (auxiliary load torque) Taux caused by the auxiliaries (the alternator 76, the air-conditioner compressor 78, and the like). As the auxiliary load torque Taux increases, the rotation variation ΔNin of the input shaft rotation speed Nin tends to increase. Therefore, the vibration determination unit 86 performs correction on the basis of a predetermined relationship such that the rotation variation ΔNin or rotation variation angular acceleration Nin' of the input shaft rotation speed Nin increases as the auxiliary load torque Taux increases.

The vibration determination unit 86 calculates a load torque Talt caused by the alternator 76 by applying the generated voltage command signal Sgen, the generated current Igen of the alternator 76, and the like, to a predetermined relationship. The vibration determination unit 86 (i) calculates the operating capacity of the air-conditioner compressor 78 by applying the air-conditioner control command signal Sac to a predetermined relationship, and (n) calculates a load torque Tac caused by the air-conditioner compressor 78 by applying the operating capacity of the air-conditioner compressor 78, and the like, to a predetermined relationship. The vibration determination unit 86 calculates the auxiliary load torque Taux by adding the load torque Talt caused by the alternator 76, the load torque Tac caused by the air-conditioner compressor 78, and the like, together.

When (i) the traveling state determination unit 85 determines that the lockup clutch 38 is controlled to any one of the engaged state and the slipped state, (ii) the traveling state determination unit 85 determines that the vehicle 10 is traveling in a state where the first power transmission path PT1 is established and (iii) the vibration determination unit 86 determines that the state of the vehicle is the predetermined state of the vehicle, the other-path state setting unit 87 alternatively sets in response to the traveling state the speed ratio γcvt of the second power transmission path PT2 to a lower vehicle speed-side speed ratio with respect to the speed ratio of the first power transmission path PT1 or a higher vehicle speed-side speed ratio with respect to the speed ratio of the first power transmission path PT1.

Figure 4:
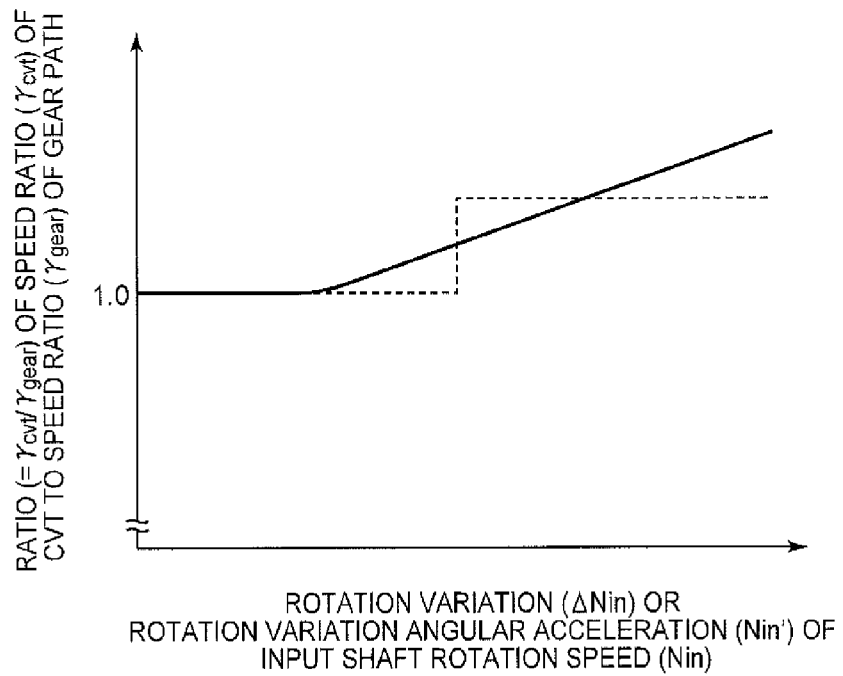
FIG. 4 is a graph that shows a predetermined relationship between a rotation variation or rotation variation angular acceleration of an input shaft rotation speed of the power transmission system and a ratio between the speed ratio of a continuously variable transmission and the speed ratio of a gear path.

Specifically, when the traveling state determination unit 85 determines that the traveling state of the vehicle 10 is the drive state, the other-path state setting unit 87 sets the speed ratio γevt of the second power transmission path PT2 to the lower vehicle speed-side speed ratio with respect to the speed ratio of the first power transmission path PT1. When it is determined that the traveling state of the vehicle 10 is the drive state, the other-path state setting unit 87 calculates a ratio Ratio (=γcvt/γgear) of the speed ratio γcvt of the continuously variable transmission 50 to the speed ratio γgear of the gear path by applying the rotation variation ΔNin or rotation variation angular acceleration Nin' of the input shaft rotation speed Nin, calculated by the vibration determination unit 86, to a predetermined relationship (map) as shown in FIG. 4. The other-path state setting unit 87 sets the speed ratio γcvt of the continuously variable transmission 50 on the basis of the calculated ratio Ratio. That is, the other-path state setting unit 87 sets the speed ratio γcvt of the continuously variable transmission 50 to a value that is the speed ratio γgear of the gear path+α. Because the speed ratio γcvt of the continuously variable transmission 50 is the speed ratio γcvt of the second power transmission path PT2, the other-path state setting unit 87 sets the speed ratio γcvt of the second power transmission path PT2 to the lower vehicle speed-side speed ratio with respect to the speed ratio of the first power transmission path PT1 by setting the speed ratio γcvt of the continuously variable transmission 50 to the lower vehicle speed-side speed ratio with respect to the speed ratio γgear established in the first power transmission path PT1.

As the rotation variation ΔNin or rotation variation angular acceleration Nin' of the input shaft rotation speed Nin increases, rattling sound in the gear path increases. In order to stop a large amplitude, it is presumable that a larger speed ratio difference (that is, the ratio Ratio needs to be much larger with respect to 1.0 (in the case of the drive state) or needs to be much smaller with respect to 1.0 (in the case of the driven state). Therefore, the map (see the continuous line) shown in FIG. 4 is set in advance such that the ratio Ratio becomes much larger with respect to 1.0 as the rotation variation ΔNin or rotation variation angular acceleration Nin' of the input shaft rotation speed Nin increases. In FIG. 4, the region in which the ratio Ratio is 1.0 is a region in which torque does not need to be circulated from the second power transmission path PT2 to the first power transmission path PT1 (that is, weak circulating torque is generated) because the rotation variation ΔNin or rotation variation angular acceleration Nin' of the input shaft rotation speed Nin is smaller than the predetermined threshold.

On the other hand, when the traveling state determination unit 85 determines that the traveling state of the vehicle 10 is the driven state, the other-path state setting unit 87 sets the speed ratio γcvt of the second power transmission path PT2 to the higher vehicle speed-side speed ratio with respect to the speed ratio of the first power transmission path PT1. When it is determined that the traveling state of the vehicle 10 is the driven state, the other-path state setting unit 87 calculates the ratio Ratio (=γcvt/γgear) of the speed ratio γcvt of the continuously variable transmission 50 to the speed ratio γgear of the gear path by applying the rotation variation ΔNin or rotation variation angular acceleration Nin of the 'input shaft rotation speed Nin, calculated by the vibration determination unit 86, to a predetermined relationship (map, see a graph (not shown) that is line-symmetric to the continuous line shown in FIG. 4 with respect to the narrow dashed line of which the ratio Ratio is 1.0). The other-path state setting unit 87 sets the speed ratio γcvt of the continuously variable transmission 50 on the basis of the calculated ratio Ratio. That is, the other-path state setting unit 87 sets the speed ratio γcvt of the continuously variable transmission 50 to a value that is the speed ratio γgear of the gear path–α. Because the speed ratio γcvt of the continuously variable transmission 50 is the speed ratio γcvt of the second power transmission path PT2, the other-path state setting unit 87 sets the speed ratio γcvt of the second power transmission path PT2 to the higher vehicle speed-side speed ratio with respect to the speed ratio of the first power transmission path PT1 by setting the speed ratio γcvt of the continuously variable transmission 50 to the higher vehicle speed-side speed ratio with respect to the speed ratio γgear established in the first power transmission path PT1.

When the vehicle 10 is traveling in the gear drive mode in which power is transmitted via the first power transmission path PT1 as a result of complete engagement of the first clutch C1 (see the continuous-line arrow A in FIG. 1), the second clutch C2 in the second power transmission path PT2 is half-engaged. Thus, in addition to the fact that power is transmitted via the second power transmission path PT2 to the drive wheels 14 side (see the dashed-line arrow B in FIG. 1), power is circulated in torque via the second power transmission path PT2 to the first power transmission path PT1 (see the dashed-line arrow C in FIG. 1). As a result, the backlash in the first power transmission path PT1 is filled, so rattling sound is prevented or reduced. Because the speed ratio γcvt of the continuously variable transmission 50 is steplessly changed in the second power transmission path PT2, the magnitude of circulating torque to the first power transmission path PT1 is allowed to be freely controlled such that weak circulating torque is generated (that is, a weak tie-up state is allowed to be appropriately caused) (see FIG. 4) in response to the rotation variation ΔNin or rotation variation angular acceleration Nin' of the input shaft rotation speed Nin even when the torque capacity of the second clutch C2 to be half-engaged is not controlled in a complicated manner. Therefore, the other-path state setting unit 87 sets an engaging pressure (that is, a hydraulic pressure command value) of the second clutch C2, which is used when torque is circulated from the second power transmission path PT2 to the first power transmission path PT1, to a predetermined engaging pressure set in advance for causing a weak tie-up state by half-engaging the second clutch C2.

When the state of the vehicle is the predetermined state of the vehicle while the vehicle is traveling in a state where the first power transmission path PT1 is established, the shift control unit 84 outputs, to the hydraulic control circuit 74, the hydraulic pressure control command signal Scvt for controlling a shift of the continuously variable transmission 50 such that the speed ratio γcvt of the continuously variable transmission 50, set by the other-path state setting unit 87, is established.

When the state of the vehicle is the predetermined state of the vehicle while the vehicle 10 is traveling in a state where the first power transmission path PT1 is established, the half-engage control unit 88 outputs, to the hydraulic control circuit 74, the hydraulic pressure control command signal for half-engaging the second clutch C2 at a predetermined engaging pressure of the second clutch C2, set by the other-path state setting unit 87, while the first power transmission path PT1 remains established (that is, while complete engagement of the first clutch C1 is maintained).

When (i) the traveling state determination unit 85 determines that the lockup clutch 38 is controlled to any one of the engaged state and the slipped state, (ii) the traveling state determination unit 85 determines that the vehicle 10 is traveling in a state where the second power transmission path PT2 is established, and (iii) the vibration determination unit 86 determines that the state of the vehicle is the predetermined state of the vehicle, the other-path state setting unit 87 sets the engaging pressure (that is, the hydraulic pressure command value) of the first clutch C1 at the time of circulating torque from the first power transmission path PT1 to the second power transmission path PT2 (that is, at the time of causing a weak tie-up state).

Figure 5:
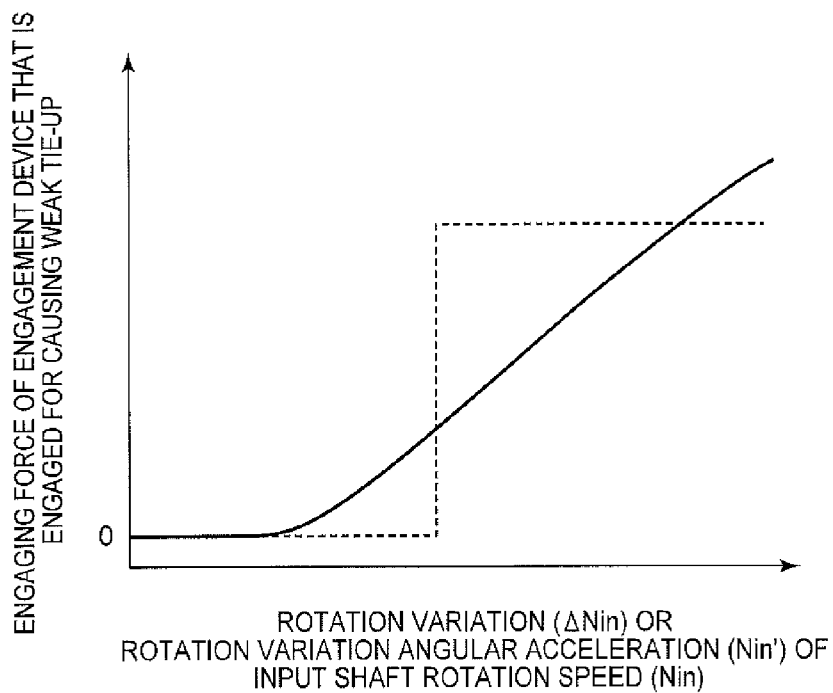
FIG. 5 is a graph that shows a predetermined relationship between a rotation variation or rotation variation angular acceleration of the input shaft rotation speed of the power transmission system and an engaging force of an engagement device that is engaged at the time of causing weak tie-up.

When torque is circulated from the first power transmission path PT1 to the second power transmission path PT2, only the fixed speed ratio γgear is established in the first power transmission path PT1, and the magnitude of circulating torque is not adjusted by steplessly changing the speed ratio. Therefore, by minutely controlling the engaging pressure of the first clutch C1, weak circulating torque is generated in response to the rotation variation ΔNin or rotation variation angular acceleration Nin' of the input shaft rotation speed Nin. Therefore, the other-path state setting unit 87 calculates the engaging force of the first clutch C1 by applying the rotation variation ΔNin or rotation variation angular acceleration Nin' of the input shaft rotation speed Nin, calculated by the vibration determination unit 86, to a predetermined relationship (map) as shown in FIG. 5, and sets the engaging pressure of the first clutch C1 by which the engaging force is obtained. The speed ratio γgear of the first power transmission path PT1 is the lower vehicle speed-side speed ratio than the speed ratio γcvt of the second power transmission path PT2 during traveling in the CVT drive mode. Therefore, torque is circulated in a direction to increase the rotation speed of the input shaft 22 by half-engaging the first clutch C1. As a result, the direction in which the rotation speed of the input shaft 22 changes as a result of torque circulation does not match the driven state. Therefore, when the traveling state is the driven state, circulating torque may be reduced by reducing the value of the engaging pressure of the first clutch C1 to be set as compared to when the traveling state is the drive state. In this way, the other-path state setting unit 87 may set the engaging pressure of the first clutch C1 in consideration of a difference in traveling state between the drive state and the driven state.

As the rotation variation ΔNin or rotation variation angular acceleration Nin' of the input shaft rotation speed Nin increases, rattling sound in the CVT path increases. It is presumable that larger circulating torque is required to stop a large amplitude. Therefore, the map (see the continuous line) shown in FIG. 5 is set in advance such that the engaging force of the engagement device that is engaged at the time of causing weak tie-up increases as the rotation variation ΔNin or rotation variation angular acceleration Nin' of the input shaft rotation speed Nin increases. In FIG. 5, the region in which the engaging force is zero is a region in which it is not required to generate weak circulating torque (that is, it is not required to cause weak tie-up) because the rotation variation ΔNin or rotation variation angular acceleration Nin' of the input shaft rotation speed Nin is smaller than the predetermined threshold.

When the state of the vehicle is the predetermined state of the vehicle while the vehicle 10 is traveling in a state where the second power transmission path PT2 is established, the half-engage control unit 88 outputs, to the hydraulic control circuit 74, the hydraulic pressure control command signal for half-engaging the first clutch C1 by using the engaging pressure of the first clutch C1, set by the other-path state setting unit 87, while the second power transmission path PT2 remains established (that is, while complete engagement of the second clutch C2 is maintained).

Figure 6:
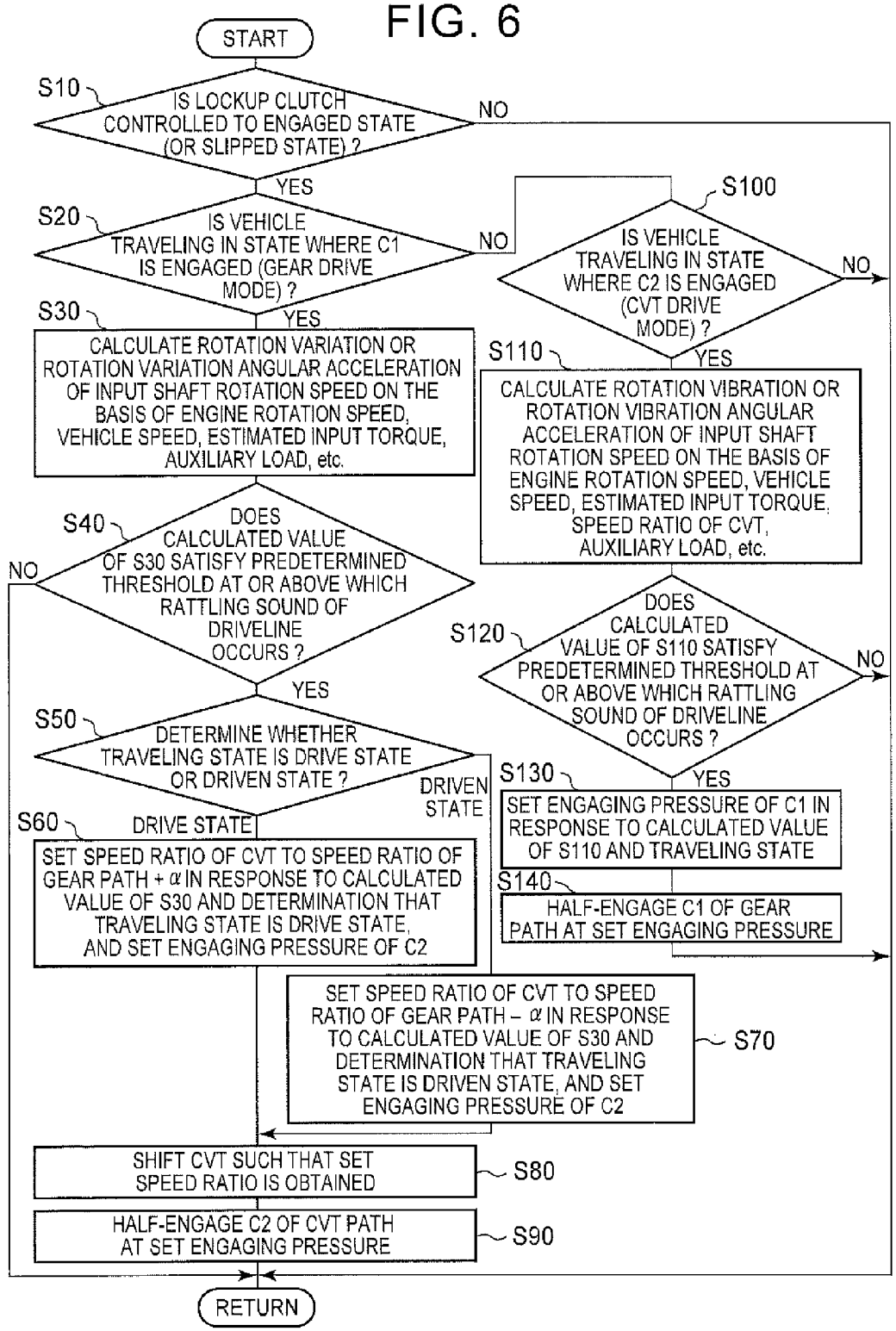
FIG. 6 is a flowchart that illustrates a relevant portion of control operations of an electronic control unit shown in FIG. 3, that is, control operations for preventing or reducing deterioration of drivability at the time of reducing a vibration of the vehicle or noise.

FIG. 6 is a flowchart that illustrates a relevant portion of control operations of the electronic control unit 80, that is, control operations for preventing or reducing deterioration of drivability at the time of reducing a vibration of the vehicle or noise. The flowchart is repeatedly executed.

In FIG. 6, initially, in step (hereinafter, step is omitted) S10 corresponding to the function of the traveling state determination unit 85, it is determined whether the lockup clutch 38 is controlled to the engaged state (or slipped state). When negative determination is made in S10, the routine is ended. When affirmative determination is made in S10, it is determined in S20 corresponding to the function of the traveling state determination unit 85 whether the vehicle 10 is traveling in the gear drive mode in which the first clutch C1 is engaged. When affirmative determination is made in S20, the rotation variation ΔNin or rotation variation angular acceleration Nin' of the input shaft rotation speed Nin is calculated on the basis of the engine rotation speed Ne, the vehicle speed V, the estimated input torque Tine, the auxiliary load, or the like, in S30 corresponding to the function of the vibration determination unit 86. Subsequently, in S40 corresponding to the function of the vibration determination unit 86, it is determined whether the calculated value in S30 satisfies the predetermined threshold at or above which rattling sound of the driveline (for example, the first power transmission path PT1) occurs. That is, it is determined whether the rotation variation ΔNin or rotation variation angular acceleration Nin' of the input shaft rotation speed Nin, calculated in S30, is larger than or equal to the predetermined threshold. When negative determination is made in S40, the routine is ended. When affirmative determination is made in S40, it is determined in S50 corresponding to the function of the traveling state determination unit 85 whether the traveling state of the vehicle 10 is the drive state or the driven state. When it is determined in S50 that the traveling state of the vehicle 10 is the drive state, in S60 corresponding to the function of the other-path state setting unit 87, in response to the rotation variation ΔNin or rotation variation angular acceleration Nin' of the input shaft rotation speed Nin, calculated in S30, and the determination that the traveling state of the vehicle 10 is the drive state, the speed ratio γcvt of the continuously variable transmission 50 is set to a value that is the speed ratio γgear of the gear path+α, and the engaging pressure of the second clutch C2 is set to the predetermined engaging pressure set in advance. On the other hand, when it is determined in S50 that the traveling state of the vehicle 10 is the driven state, in S70 corresponding to the function of the other-path state setting unit 87, in response to the rotation variation ΔNin or rotation variation angular acceleration Nin' of the input shaft rotation speed Nin, calculated in S30, and the determination that the traveling state of the vehicle 10 is the driven state, the speed ratio γcvt of the continuously variable transmission 50 is set to a value that is the speed ratio γgear of the gear path−α, and the engaging pressure of the second clutch C2 is set to the predetermined engaging pressure set in advance. Subsequently to S60 or S70, in S80 corresponding to the function of the shift control unit 84, a shift of the continuously variable transmission 50 is controlled such that the speed ratio γcvt of the continuously variable transmission 50, set in S60 or S70, is established. Subsequently, in S90 corresponding to the function of the half-engage control unit 88, the second clutch C2 of the CVT path is half-engaged at the predetermined engaging pressure of the second clutch C2, set in S60 or S70. On the other hand, when negative determination is made in S20, it is determined in S100 corresponding to the function of the traveling state determination unit 85 whether the vehicle 10 is traveling in the CVT drive mode in which the second clutch C2 is engaged. When negative determination is made in S100, the routine is ended. When affirmative determination is made in S100, the rotation variation ΔNin or rotation variation angular acceleration Nin' of the input shaft rotation speed Nin is calculated on the basis of the engine rotation speed Ne, the vehicle speed V, the estimated input torque Tine, the speed ratio γcvt of the continuously variable transmission 50, the auxiliary load, or the like, in S110 corresponding to the function of the vibration determination unit 86. Subsequently, in S120 corresponding to the function of the vibration determination unit 86, it is determined whether the calculated value in S110 satisfies the predetermined threshold at or above which rattling sound of the driveline (for example, the second power transmission path PT2) occurs. That is, it is determined whether the rotation variation ΔNin or rotation variation angular acceleration Nin' of the input shaft rotation speed Nin, calculated in S110, is larger than or equal to the predetermined threshold. When negative determination is made in S120, the routine is ended. When affirmative determination is made in S120, the engaging pressure of the first clutch C1 is set in response to the rotation variation ΔNin or rotation variation angular acceleration Nin' of the input shaft rotation speed Nin, calculated in S110, and the difference in traveling state between the drive state and the driven state in S130 corresponding to the function of the other-path state setting unit 87. Subsequently, in S140 corresponding to the function of the half-engage control unit 88, the first clutch C1 in the gear path is half-engaged at the engaging pressure of the first clutch C1, set in S130.

As described above, according to the present first embodiment, when the state of the vehicle is the predetermined state of the vehicle where a vibration of the vehicle occurs, weak circulating torque is generated to fill the backlash inside the automatic transmission 24 and in the power transmission path by half-engaging the second clutch C2 for establishing the second power transmission path PT2 while the first power transmission path PT1 remains established in the automatic transmission 24. Thus, it is possible to reduce a vibration of the vehicle or noise resulting from the vibration of the vehicle. At this time, because the speed ratio of the second power transmission path PT2 is alternatively set in response to the traveling state to the lower vehicle speed-side speed ratio with respect to the speed ratio of the first power transmission path PT1 or the higher vehicle speed-side speed ratio with respect to the speed ratio of the first power transmission path PT1. Therefore, it is possible to generate weak circulating torque in a direction to increase the input shaft rotation speed Nin of the automatic transmission 24 or in a direction to reduce the input shaft rotation speed Nin of the automatic transmission 24 (that is, to fill the backlash) in accordance with the traveling state, such as a state where the vehicle is accelerating, a state where the vehicle is decelerating and a state where the vehicle is traveling on an uphill or downhill. Thus, at the time of reducing a vibration of the vehicle or noise, it is possible to prevent or reduce deterioration of drivability.

According to the present first embodiment, when the traveling state is the drive state, the speed ratio γcvt of the second power transmission path PT2 is set to the lower vehicle speed-side speed ratio with respect to the speed ratio of the first power transmission path PT1. Therefore, it is possible to generate weak circulating torque in a direction to increase the input shaft rotation speed Nin of the automatic transmission 24 (that is, to fill the backlash). On the other hand, when the traveling state is the driven state, the speed ratio γcvt of the second power transmission path PT2 is set to the higher vehicle speed-side speed ratio with respect to the speed ratio of the first power transmission path PT1. Therefore, it is possible to generate weak circulating torque in a direction to reduce the input shaft rotation speed Nin of the automatic transmission 24 (that is, to fill the backlash).

According to the present first embodiment, by setting the speed ratio γcvt of the continuously variable transmission 50 to the lower vehicle speed-side speed ratio or the higher vehicle speed-side speed ratio, it is possible to easily alternatively set in response to the traveling state the speed ratio γcvt of the second power transmission path PT2 to the lower vehicle speed-side speed ratio with respect to the speed ratio of the first power transmission path PT1 or the higher vehicle speed-side speed ratio with respect to the speed ratio of the first power transmission path PT1. At this time, because the speed ratio γcvt of the second power transmission path PT2 is allowed to be steplessly adjusted, it is possible to exert inertia suitable for a state of the vehicle (that is, it is possible to generate weak circulating torque in response to a traveling state). That is, it is possible to cause a weak tie-up state without intricately adjusting the engaging pressure at which the second clutch C2 for establishing the second power transmission path PT2 is half-engaged.

According to the present first embodiment, because the state of the vehicle is changed on the basis of the auxiliary load that influences the magnitude of actual power of the engine 12, which is transmitted to the first power transmission path PT1, the state of the vehicle where a vibration of the vehicle or noise resulting from the vibration of the vehicle occurs is appropriately determined.

Next, a second embodiment of the present disclosure will be described. In the following description, like reference numerals denote portions common to the first and second embodiments, and the description thereof is omitted.

Figures 7, 8:
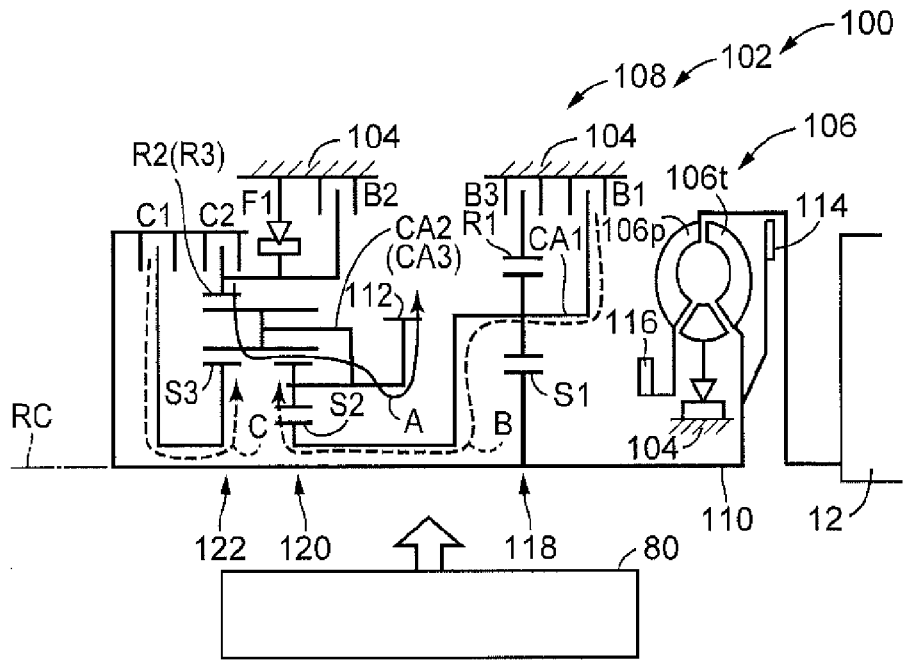
FIG. 7 is a view that illustrates the schematic configuration of a vehicle to which a second embodiment of the present disclosure is applied.
FIG. 8 is an operation chart that illustrates the relationship between a shift operation of an automatic transmission shown in FIG. 7 and a combination of activated engagement devices that are used in the shift operation.

FIG. 7 is a view that illustrates the schematic configuration of a vehicle 100 to which the second embodiment of the present disclosure is applied and which is different from the vehicle 10 to which the above-described first embodiment is applied. In FIG. 7, the vehicle 100 includes a power transmission system 102 provided in a power transmission path between the engine 12 and drive wheels (not shown in FIG. 7). The power transmission system 102 includes a torque converter 106, an automatic transmission 108, and the like, along an axis RC inside a housing 104 that serves as a non-rotating member. The torque converter 106 is coupled to the engine 12. The automatic transmission 108 is coupled to the torque converter 106. In the power transmission system 102, the power of the engine 12 is transmitted from the torque converter 106 to an input shaft 110, and is output from an output gear 112 to the drive wheels. The input shaft 110 is the input rotating member of the automatic transmission 108. The output gear 112 is the output rotating member of the automatic transmission 108. The torque converter 106, the automatic transmission 108, and the like, are formed substantially symmetric with respect to the center line (axis RC). In FIG. 7, the lower half with respect to the center line is omitted.

The torque converter 106 includes a lockup clutch 114 that is able to directly couple a pump impeller 106p and a turbine runner 106t to each other, that is, the input and output rotating members of the torque converter 106 to each other. The power transmission system 102 includes a mechanical oil pump 116 coupled to the pump impeller 106p. The oil pump 116 generates (discharges) hydraulic pressure for shift control over the automatic transmission 108 or supplying lubricating oil to portions of the power transmission system 102 by being driven by the engine 12 to rotate.

The automatic transmission 108 is a stepped transmission in which a plurality of gear stages (speed stages) are selectively established by engaging predetermined engagement devices among a plurality of engagement devices. The automatic transmission 108 is a planetary gear-type multi-stage transmission that carries out a so-called clutch-to-clutch shift that is often used in a known vehicle.

Specifically, the automatic transmission 108 includes a single-pinion first planetary gear train 118, a double-pinion second planetary gear train 120 and a single-pinion third planetary gear train 122 along the same axis (axis RC). The second planetary gear train 120 and the third planetary gear train 122 are configured as a Ravigneaux type. The automatic transmission 108 shifts the speed of rotation of the input shaft 110, and outputs the rotation from the output gear 112. In the automatic transmission 108, rotating elements (sun gears S1 to S3, carriers CA1 to CA3 and ring gears R1 to R3) of the first planetary gear train 118, second planetary gear train 120 and third planetary gear train 122 are partially coupled to each other or coupled to the input shaft 110, the housing 104 or the output gear 112 directly or indirectly (or selectively) via engagement devices (clutches C1, C2 and brakes B1, B2, B3) and a one-way clutch F1, The automatic transmission 108 establishes each of six forward speed stages and one reverse speed stage as shown in an engagement operation chart of FIG. 8 in response to driver's accelerator operation, a vehicle speed V, and the like, through control for engaging or releasing each of the clutches C1, C2 and brakes B1, B2, B3. In FIG. 6, "1st" to "6th" mean a first speed stage to a sixth speed stage as the forward speed stages, "R" means the reverse speed stage, and "N" means a neutral state where no speed stage is established. The engagement operation chart of FIG. 8 provides a summary of the relationship among each of the above-described speed stages and the operation states of the clutches C1, C2 and brakes B1, B2, B3. The circle mark denotes an engaged state, the double-circle mark denotes an engaged state only during engine brake, and the blank denotes a released state. Because the one-way clutch F is provided in parallel with the brake B2 that establishes the first speed stage "1st", the brake B2 does not always need to be engaged at the time when the vehicle 100 starts moving (accelerates). Each of the clutches C1, C2 and the brakes B1, B2, B3 (hereinafter, simply referred to as clutch C, brake B or engagement device when not specifically distinguished from each other) is a known hydraulic wet-type friction engagement device (friction clutch) that is frictionally engaged by a hydraulic actuator.

In the thus configured vehicle 100, as well as the vehicle 10 according to the above-described first embodiment, in order to improve fuel economy, it is suggested that a region in which the lockup clutch 114 is placed in an engaged state or a slipped state is expanded to a low rotation speed region of the engine rotation speed Ne or a low vehicle speed region of the vehicle speed V. Therefore, when the vehicle 100 travels at a low vehicle speed, a low engine rotation speed and a low load while the engine 12 and the automatic transmission 108 are in a directly coupled state (or a state close to the directly coupled state) as a result of engagement of the lockup clutch 114, or the like, a vibration of the vehicle easily occurs, and rattling sound occurs at a meshing portion of the power transmission path in the power transmission system 102, with the result that an occupant may feel discomfort.

As in the case of the above-described first embodiment, in a predetermined traveling state where a vibration of the vehicle occurs during traveling in a state where one of the first power transmission path PT1 and the second power transmission path PT2 is established, the electronic control unit 80 half-engages the engagement device for establishing the other power transmission path while the one power transmission path remains established. Thus, it is possible to fill the backlash inside the automatic transmission 108 and the backlash of the one power transmission path by circulating torque from the other power transmission path to the one power transmission path. Thus, it is possible to reduce a vibration of the vehicle or noise resulting from the vibration of the vehicle. The first power transmission path PT1 is a power transmission path that is able to transmit power when any one of the forward speed stages is established. The second power transmission path PT2 is a power transmission path that is able to transmit power when any one of the forward speed stages, other than the above forward speed stage, is established. Incidentally, in the vehicle 100 as well, as well as the vehicle 10 according to the above-described first embodiment, if the direction in which the rotation speed of the input shaft 110 changes as a result of torque circulation does not match the traveling state, such as a state where the vehicle 100 is accelerating, a state where the vehicle 100 is decelerating and a state where the vehicle 100 is traveling on an uphill or downhill, there is a concern that drivability deteriorates.

Therefore, as in the case of the above-described first embodiment, when (i) the traveling state determination unit 85 determines that the lockup clutch 114 is controlled to any one of the engaged state and the slipped state, (ii) the traveling state determination unit 85 determines that the vehicle 100 is traveling in a state where the first power transmission path PT1 is established and (iii) the vibration determination unit 86 determines that the state of the vehicle is the predetermined state of the vehicle, the other-path state setting unit 87 alternatively sets in response to the traveling state the speed ratio γpt2 of the second power transmission path PT2 to the lower vehicle speed-side speed ratio with respect to the speed ratio of the first power transmission path PT1 or the higher vehicle speed-side speed ratio with respect to the speed ratio of the first power transmission path PT1. Specifically, when the traveling state determination unit 85 determines that the traveling state of the vehicle 100 is the drive state, the other-path state setting unit 87 sets the speed ratio γpt2 of the second power transmission path PT2 to the lower vehicle speed-side speed ratio with respect to the speed ratio of the first power transmission path PT1. On the other hand, when the traveling state determination unit 85 determines that the traveling state of the vehicle 100 is the driven state, the other-path state setting unit 87 sets the speed ratio γpt2 of the second power transmission path PT2 to the higher vehicle speed-side speed ratio with respect to the speed ratio of the first power transmission path PT1. The first power transmission path PT1 is a power transmission path that is able to transmit power at the currently established speed stage. The second power transmission path PT2 is a power transmission path that is able to transmit power at a lower vehicle speed-side speed stage or higher vehicle speed-side speed stage, which is different from the currently established speed stage. Therefore, the other-path state setting unit 87 sets the speed ratio γpt2 of the second power transmission path PT2 to the lower vehicle speed-side speed ratio or the higher vehicle speed-side speed ratio with respect to the speed ratio of the first power transmission path PT1 by setting the speed stage for establishing the second power transmission path PT2 to the lower vehicle speed-side speed stage or the higher vehicle speed-side speed stage with respect to the currently established speed stage.

When slip control over the lockup clutch 114 is executed while the vehicle is decelerating at a certain speed stage (for example, fifth speed stage) until a low engine rotation speed and a low vehicle speed, rattling sound of the driveline (power transmission path) may occur as a result of a rotation variation (see the continuous-line arrow A in FIG. 7 and the portion A surrounded by the continuous line in FIG. 8). At this time, by half-engaging the engagement device (for example, brake B1) of a different speed stage (for example, sixth speed stage), circulating torque is generated as a result of application of driving force to the different speed stage side (see the dashed-line arrow B in FIG. 7 and the portion B surrounded by the dashed line in FIG. 8), and the backlash is forcibly filled, so rattling sound is prevented or reduced. Depending on the traveling state, by half-engaging the engagement device (for example, clutch C1) of a different speed stage (for example, fourth speed stage), circulating torque is generated as a result of application of driving force to the different speed stage side (see the dashed-line arrow C in FIG. 7 and the portion C surrounded by the dashed line in FIG. 8), and the backlash is forcibly filled, so rattling sound is prevented or reduced.

In the case of a stepped transmission like the automatic transmission 108, because the speed ratio γpt2 is fixed in the second power transmission path PT2 that is used to cause weak tie-up and that is other than the first power transmission path PT1 that is currently used for propelling the vehicle 100, it is not possible to adjust the magnitude of circulating torque by steplessly changing the speed ratio. Therefore, by minutely controlling the engaging pressure of the engagement device for establishing the second power transmission path PT2 (speed stage) that is used to cause weak tie-up, weak circulating torque is generated in response to the rotation variation ΔNin or rotation variation angular acceleration Nin' of the input shaft rotation speed Nin. Therefore, the other-path state setting unit 87 calculates the engaging force of the engagement device that is used to cause weak tic-up by applying the rotation variation ΔNin or rotation variation angular acceleration Nin' of the input shaft rotation speed Nin, calculated by the vibration determination unit 86, to the predetermined relationship (map) as shown in FIG. 5, and sets the engaging pressure of the engagement device by which the engaging force is obtained.

As described above, according to the present second embodiment, by setting the speed stage for establishing the second power transmission path PT2 to the lower vehicle speed-side speed stage or the higher vehicle speed-side speed stage with respect to the currently established speed stage, it is possible to easily alternatively set in response to the traveling state the speed ratio γpt2 of the second power transmission path PT2 to the lower vehicle speed-side speed ratio with respect to the speed ratio of the first power transmission path PT1 or the higher vehicle speed-side speed ratio with respect to the speed ratio of the first power transmission path PT1.

The first and second embodiments of the present disclosure are described in detail with reference to the accompanying drawings; however, the present disclosure is also applicable to other embodiments.

For example, in the above-described first and second embodiments, when torque is circulated from the other power transmission path to the one power transmission path, the magnitude of circulating torque is adjusted by changing the speed ratio of the other power transmission path or controlling the engaging pressure of the engagement device for establishing the other power transmission path; however, the present disclosure is not limited to this mode. For example, in the case where a condition in which rattling sound occurs is a narrow range of a low vehicle speed and low load, when the rotation variation ΔNin or rotation variation angular acceleration Nin' of the input shaft rotation speed NM falls within a predetermined range, torque circulation may be carried out at an optimal predetermined speed ratio or an optimal predetermined engaging pressure (see the wide dashed lines in FIG. 4 and FIG. 5). When the engagement device is not operated hydraulically but operated electromagnetically or through motor control, not the engaging pressure but the engaging force is controlled. In this case, an engaging force calculated from the map as shown in FIG. 5 is directly used as a set value of the engagement device at the time of carrying out torque circulation.

In the above-described first and second embodiments, the traveling state determination unit 85 determines whether the traveling state of the vehicle 10 or vehicle 100 is the drive state or the driven state. It is also presumable that the traveling state of the vehicle 10 is a neutral state that is neither the drive state nor the driven state and in which no power is transmitted. In the case of the neutral state, because a feeling of strangeness may be experienced if force in the accelerating direction is applied to the vehicle 10 or the vehicle 100 through torque circulation, the neutral state may be included in the driven state.

In the above-described first and second embodiments, the vibration determination unit 86 determines whether the state of the vehicle is the predetermined state of the vehicle where a vibration of the vehicle occurs by determining whether the rotation variation ΔNin or rotation variation angular acceleration NM' of the input shaft rotation speed Nin, calculated on the basis of the engine rotation speed Ne, the vehicle speed V, the estimated input torque Tine, or the like, is larger than or equal to the predetermined threshold; however, the present disclosure is not limited to this mode. For example, the vibration determination unit 86 may determine whether the state of the vehicle is the predetermined state of the vehicle where a vibration of the vehicle occurs by determining whether any one of the engine rotation speed Ne, the vehicle speed V, the estimated input torque Tine, and the like, is larger than or equal to a corresponding one of predetermined thresholds respectively set in advance. In this case, any one of the engine rotation speed Ne, the vehicle speed V, the estimated input torque Tine, and the like, is used for the abscissa axis of each of FIG. 4 and FIG. 5

In the above-described first and second embodiments, the vehicle 10 including the automatic transmission 24 having the first power transmission path PT1 in which the gear transmission mechanism 54 is interposed and the second power transmission path PT2 in which the continuously variable transmission 50 is interposed or the vehicle 100 including the automatic transmission 108 that is a stepped transmission is illustrated as the vehicle to which the present disclosure is applied; however, the present disclosure is not limited to this mode. For example, the vehicle to which the present disclosure is applied may be a vehicle including a so-called dual clutch transmission (DCT) that is a synchromesh parallel two-shaft automatic transmission including two-line input shafts to which engagement devices are respectively connected and which are respectively connected to even-numbered speed stages and odd-numbered speed stages. In short, as long as a vehicle includes an automatic transmission that selectively establishes a first power transmission path or a second power transmission path, which transmits the power of a driving force source to a drive wheel, the present disclosure is applicable to the vehicle.

In the above-described first and second embodiments, the traveling state determination unit 85 determines whether the lockup clutch 38 or the lockup clutch 114 is controlled to any one of the engaged state and the slipped state on the basis of the hydraulic pressure command value; however, the present disclosure is not limited to this mode. For example, the traveling state determination unit 85 may determine whether the lockup clutch 38 or the lockup clutch 114 is controlled to any one of the engaged state and the slipped state on the basis of whether a differential rotation speed between the pump impeller 20p and the turbine runner 20t or a differential rotation speed between the pump impeller 106p and the turbine runner 106t is smaller than a predetermined rotation difference.

In the above-described first embodiment, the gear transmission mechanism 54 is a transmission mechanism in which one gear stage having a lower speed ratio than the lowest speed ratio γmax of the continuously variable transmission 50 is established; however, the present disclosure is not limited to this configuration. For example, the gear transmission mechanism 54 may be a transmission mechanism in which a plurality of gear stages having different speed ratios are established. That is, the gear transmission mechanism 54 may be a stepped transmission that is shifted into two or more stages. The gear transmission mechanism 54 may be a transmission mechanism that establishes a speed ratio higher than the highest speed ratio γmin of the continuously variable transmission 50 and a speed ratio lower than the lowest speed ratio γmax of the continuously variable transmission 50.

In the above-described first and second embodiments, the drive mode of the power transmission system 16 is changed by using a predetermined shift map; however, the present disclosure is not limited to this configuration. For example, the drive mode of the power transmission system 16 may be changed by calculating a driver's required driving amount (for example, required torque) on the basis of the vehicle speed V and the accelerator operation amount θacc and setting the speed ratio by which the required torque is satisfied.

In the above-described first and second embodiments, the engine 12 is illustrated as a driving force source; however, the driving force source is not limited to the engine 12. For example, another prime mover, such as an electric motor, may be employed solely or in combination with the engine 12 as the driving force source. The power of the engine 12 is transmitted to the input shaft 22 via the torque converter 20 or transmitted to the input shaft 110 via the torque converter 106; however, the present disclosure is not limited to this configuration. For example, instead of the torque converter 20 or the torque converter 106, another fluid transmission device, such as a fluid coupling having no torque amplification function, may be used. Alternatively, the fluid transmission device may be not necessarily provided. The dog clutch D1 includes the synchromesh mechanism Si. The synchromesh mechanism Si may be not necessarily provided. The continuously variable transmission 50 includes the transmission belt 72 wound around the pulleys 66, 70 to span between the pulleys 66, 70; however, the present disclosure is not limited to this mode. Instead of the transmission belt 72, a transmission chain may be used.

In this case, the continuously variable transmission 50 is a chain-type continuously variable transmission mechanism; however, broadly, the concept of the belt-type continuously variable transmission mechanism may include the chain-type continuously variable transmission mechanism. The continuously variable transmission 50 may be a toroidal continuously variable transmission mechanism instead of the belt-type continuously variable transmission mechanism.

The above-described embodiments are only illustrative, and the present disclosure may be implemented in modes including various modifications or improvements on the basis of the knowledge of persons skilled in the art.

What is claimed is:

1. A control apparatus for a power transmission system, the power transmission system including an automatic transmission configured to transmit power of a driving force source to a drive wheel and selectively establish one of a first power transmission path and a second power transmission path, the control apparatus comprising:
   an electronic control unit configured to:
   (i) determine whether a state of a vehicle is a predetermined state of the vehicle where a vibration of the vehicle occurs,
   (ii) when the state of the vehicle is the predetermined state of the vehicle while the vehicle is traveling in a state where the first power transmission path is established, half-engage an engagement device configured to establish the second power transmission path while the first power transmission path remains established, and
   (iii) when the state of the vehicle is the predetermined state of the vehicle while the vehicle is traveling in the state where the first power transmission path is established, alternatively set, in response to a traveling state of the vehicle, a speed ratio of the second power transmission path to one of a lower vehicle speed-side speed ratio with respect to a speed ratio of the first power transmission path and a higher vehicle speed-side speed ratio with respect to the speed ratio of the first power transmission path.

2. The control apparatus according to claim 1, wherein the electronic control unit is configured to:
   (i) determine whether the traveling state is one of a drive state and a driven state,
   (ii) when the traveling state is the drive state, set the speed ratio of the second power transmission path to the lower vehicle speed-side speed ratio with respect to the speed ratio of the first power transmission path, and,
   (iii) when the traveling state is the driven state, set the speed ratio of the second power transmission path to the higher vehicle speed-side speed ratio with respect to the speed ratio of the first power transmission path.

3. The control apparatus according to claim 1, wherein the automatic transmission includes a transmission mechanism, a continuously variable transmission mechanism, a first engagement device and a second engagement device,
   the transmission mechanism and the continuously variable transmission mechanism are provided in parallel with each other in a power transmission path between an input rotating member to which power of the driving force source is transmitted and an output rotating member that outputs the power to the drive wheel, so as to establish a speed stage, the first engagement device is configured to establish the first power transmission path in which the transmission mechanism is interposed,
   the second engagement device is configured to establish the second power transmission path in which the continuously variable transmission mechanism is interposed, and
   the electronic control unit is configured to set the speed ratio of the second power transmission path to one of the lower vehicle speed-side speed ratio with respect to the speed ratio of the first power transmission path and the higher vehicle speed-side speed ratio with respect to the speed ratio of the first power transmission path by setting a speed ratio of the continuously variable transmission mechanism to one of a lower vehicle speed-side speed ratio with respect to the speed ratio established in the first power transmission path and a higher vehicle speed-side speed ratio with respect to the speed ratio established in the first power transmission path.

4. The control apparatus according to claim 1, wherein the automatic transmission is a stepped transmission in which a plurality of speed stages are selectively established by engaging a predetermined engagement device, and
   the electronic control unit is configured to set the speed ratio of the second power transmission path to one of the lower vehicle speed-side speed ratio with respect to the speed ratio of the first power transmission path and the higher vehicle speed-side speed ratio with respect to the speed ratio of the first power transmission path by setting a speed stage that is established in the second power transmission path to one of a lower vehicle speed-side speed stage with respect to a currently established speed stage of the second power transmission path and a higher vehicle speed-side speed stage with respect to a currently established speed stage of the second power transmission path.

5. The control apparatus according to claim 1, wherein the electronic control unit is configured to change the state of the vehicle based on an auxiliary load.

6. The control apparatus according to claim 1, wherein the electronic control unit is configured to determine whether the vehicle is in a vibration generating state based on whether at least one of a rotation variation or rotation variation angular acceleration of an input shaft rotation speed of the automatic transmission is larger than or equal to a predetermined threshold, at least one of the rotation variation or the rotation variation angular acceleration being calculated based on at least one of an engine rotation speed, a vehicle speed or an estimated input torque of the automatic transmission.

7. The control apparatus according to claim 1, wherein the electronic control unit is configured to determine whether the vehicle is in a vibration generating state based on whether at least one of an engine rotation speed, a vehicle speed or an estimated input torque of the automatic transmission is larger than or equal to a corresponding one of respectively set predetermined thresholds.

* * * * *